US008856826B2

(12) United States Patent
Benschoter et al.

(10) Patent No.: US 8,856,826 B2
(45) Date of Patent: *Oct. 7, 2014

(54) SYSTEM AND METHOD FOR EFFECTIVELY PRESENTING MULTIMEDIA INFORMATION MATERIALS

(75) Inventors: Brian N. Benschoter, Austin, TX (US); Todd P. Callahan, Austin, TX (US)

(73) Assignee: Time Warner Cable Enterprises LLC, New York, NY (US)

( * ) Notice: Subject to any disclaimer, the term of this patent is extended or adjusted under 35 U.S.C. 154(b) by 578 days.

This patent is subject to a terminal disclaimer.

(21) Appl. No.: 12/589,580

(22) Filed: Oct. 26, 2009

(65) Prior Publication Data

US 2010/0049699 A1    Feb. 25, 2010

Related U.S. Application Data

(63) Continuation of application No. 09/994,985, filed on Nov. 26, 2001, now Pat. No. 7,610,358.

(51) Int. Cl.
| | |
|---|---|
| G06F 13/00 | (2006.01) |
| H04L 29/06 | (2006.01) |
| H04N 21/482 | (2011.01) |
| H04N 21/845 | (2011.01) |
| H04N 21/258 | (2011.01) |
| G06F 17/30 | (2006.01) |
| H04N 21/462 | (2011.01) |
| H04N 21/472 | (2011.01) |
| H04N 7/173 | (2011.01) |
| H04L 29/08 | (2006.01) |

(52) U.S. Cl.
CPC ........... *H04L 65/4092* (2013.01); *H04L 69/329* (2013.01); *H04L 67/02* (2013.01); *H04N 21/4825* (2013.01); *H04N 21/8456* (2013.01); *H04L 67/306* (2013.01); *H04N 21/4828* (2013.01); *H04L 29/06027* (2013.01); *H04N 21/25891* (2013.01); *G06F 17/30029* (2013.01); *H04L 29/06* (2013.01); *H04N 21/4622* (2013.01); *H04N 21/47205* (2013.01); *H04N 21/25875* (2013.01); *H04L 65/604* (2013.01); *G06F 17/30056* (2013.01); *H04N 7/17318* (2013.01); *H04L 65/4084* (2013.01)
USPC .................... 725/37; 725/52; 725/59; 725/60; 725/61; 725/139; 725/143; 725/147; 707/722; 707/736

(58) Field of Classification Search
USPC ....................... 707/708, 722, 736; 725/37–61
See application file for complete search history.

(56) References Cited

U.S. PATENT DOCUMENTS 4,177,462 A * 12/1979 Chung .............................. 345/22
4,232,374 A * 11/1980 Chung et al. .................. 345/629

(Continued)

OTHER PUBLICATIONS

Customizing News Content for Individuals and Communities, Marko Turpeinen, Helsinki University of Technology; hereinafter Turpeinen, pp. 1-119.*

(Continued)

*Primary Examiner* — Hanh Thai
(74) *Attorney, Agent, or Firm* — Cozen O'Connor; Brandon N. Sklar

(57) ABSTRACT

Methods and systems for presenting multimedia information materials from a database, preferably as a video broadcast. In one example, a plurality of information segments, such as video clips, are stored in the database, information segments are selected from the database, and a user can organize a subset of the selected information segments to affect a presentation of those information segments in desired order. The selected information segments may be loaded into a memory. The selected information segments may also be represented using indicators. The subset of selected information segments may be presented in the same order as the corresponding indicators. The presentation may be realized on a computer, a media player, or a television, the latter of which may interface with a set-top box and/or a personal video recorder.

29 Claims, 8 Drawing Sheets

(56) References Cited

U.S. PATENT DOCUMENTS

| | | | | |
|---|---|---|---|---|
| 5,528,282 | A | 6/1996 | Voeten et al. | |
| 5,706,097 | A * | 1/1998 | Schelling et al. | 358/296 |
| 5,818,510 | A * | 10/1998 | Cobbley et al. | 725/139 |
| 5,864,868 | A | 1/1999 | Contois | |
| 5,905,981 | A | 5/1999 | Lawler | |
| 5,913,039 | A | 6/1999 | Nakamura et al. | |
| 5,945,988 | A | 8/1999 | Williams et al. | |
| 6,011,537 | A | 1/2000 | Slotznick | |
| 6,018,724 | A * | 1/2000 | Arent | 705/44 |
| 6,020,883 | A | 2/2000 | Herz et al. | |
| 6,028,603 | A | 2/2000 | Wang et al. | |
| 6,061,056 | A | 5/2000 | Menard et al. | |
| 6,081,263 | A | 6/2000 | LeGall et al. | |
| 6,097,389 | A | 8/2000 | Morris et al. | |
| 6,141,007 | A | 10/2000 | Lebling et al. | |
| 6,166,735 | A | 12/2000 | Dom et al. | |
| 6,195,655 | B1 | 2/2001 | Lawler | |
| 6,202,061 | B1 | 3/2001 | Khosla et al. | |
| 6,226,618 | B1 | 5/2001 | Downs et al. | |
| 6,233,351 | B1 * | 5/2001 | Feeney et al. | 382/155 |
| 6,248,946 | B1 | 6/2001 | Dwek | |
| 6,256,623 | B1 | 7/2001 | Jones | |
| 6,262,723 | B1 | 7/2001 | Matsuzawa et al. | |
| 6,262,724 | B1 | 7/2001 | Crow et al. | |
| 6,263,507 | B1 | 7/2001 | Ahmad et al. | |
| 6,272,078 | B2 | 8/2001 | Yankowski | |
| 6,385,596 | B1 | 5/2002 | Wiser et al. | |
| 6,388,958 | B1 | 5/2002 | Yankowski | |
| 6,389,467 | B1 | 5/2002 | Eyal | |
| 6,452,609 | B1 | 9/2002 | Katinsky et al. | |
| 6,453,471 | B1 | 9/2002 | Klosterman | |
| 6,484,156 | B1 | 11/2002 | Gupta et al. | |
| 6,526,411 | B1 | 2/2003 | Ward | |
| 6,538,665 | B2 | 3/2003 | Crow et al. | |
| 6,615,248 | B1 | 9/2003 | Smith | |
| 6,631,522 | B1 | 10/2003 | Erdelyi | |
| 6,670,971 | B1 | 12/2003 | Oral | |
| 6,678,680 | B1 | 1/2004 | Woo | |
| 6,714,909 | B1 | 3/2004 | Gibbon et al. | |
| 6,721,741 | B1 | 4/2004 | Eyal et al. | |
| 6,731,312 | B2 | 5/2004 | Robbin | |
| 6,760,042 | B2 | 7/2004 | Zetts | |
| 6,760,916 | B2 | 7/2004 | Holtz et al. | |
| 6,763,377 | B1 | 7/2004 | Belknap et al. | |
| 6,825,861 | B2 | 11/2004 | Wasko et al. | |
| 6,868,403 | B1 | 3/2005 | Wiser et al. | |
| 6,880,171 | B1 | 4/2005 | Ahmad et al. | |
| 6,917,373 | B2 | 7/2005 | Vong et al. | |
| 6,937,770 | B1 | 8/2005 | Oguz et al. | |
| 6,941,359 | B1 * | 9/2005 | Beaudoin et al. | 709/221 |
| 6,950,623 | B2 | 9/2005 | Brown et al. | |
| 6,952,221 | B1 | 10/2005 | Holtz et al. | |
| 6,968,005 | B2 * | 11/2005 | Hannuksela | 375/240.01 |
| 7,020,704 | B1 | 3/2006 | Lipscomb et al. | |
| 7,024,677 | B1 * | 4/2006 | Snyder et al. | 725/86 |
| 7,039,684 | B2 | 5/2006 | Blockton et al. | |
| 7,076,535 | B2 | 7/2006 | Gupta et al. | |
| 7,103,905 | B2 | 9/2006 | Novak | |
| 7,127,735 | B1 | 10/2006 | Lee et al. | |
| 7,155,734 | B1 * | 12/2006 | Shimomura et al. | 725/81 |
| 7,162,696 | B2 | 1/2007 | Wakefield | |
| 7,197,758 | B1 * | 3/2007 | Blackketter et al. | 725/37 |
| 7,200,586 | B1 | 4/2007 | Deguchi | |
| 7,216,008 | B2 | 5/2007 | Sakata | |
| 7,222,163 | B1 | 5/2007 | Girouard et al. | |
| 7,263,497 | B1 | 8/2007 | Wiser et al. | |
| 7,281,034 | B1 | 10/2007 | Eyal | |
| 7,340,765 | B2 | 3/2008 | Feldmeier | |
| 7,400,684 | B2 * | 7/2008 | Hannuksela et al. | 375/240.27 |
| 7,409,643 | B2 * | 8/2008 | Daughtrey | 715/763 |
| 7,610,358 | B2 * | 10/2009 | Benschoter et al. | 709/219 |
| 7,711,052 | B2 * | 5/2010 | Hannuksela et al. | 375/240.27 |
| 7,877,774 | B1 * | 1/2011 | Basso et al. | 725/44 |
| 8,042,063 | B1 * | 10/2011 | Lin-Hendel | 715/838 |
| 2001/0040926 | A1 * | 11/2001 | Hannuksela et al. | 375/240.27 |
| 2002/0015400 | A1 * | 2/2002 | Morinaga et al. | 370/345 |
| 2002/0056100 | A1 * | 5/2002 | Shimomura et al. | 725/39 |
| 2002/0109728 | A1 * | 8/2002 | Tiongson et al. | 345/786 |

OTHER PUBLICATIONS

Munger, Michel, "iBasics: iTunes—Encode, Organize and Play"; pp. 1-5, Apr. 4, 2001.

"NY1 Video/Audio" webpage, www.ny1.com/ny/VideoAudio/index.html, pp. 1 and 2, 2001.

* cited by examiner

SYSTEM AND METHOD FOR EFFECTIVELY PRESENTING MULTIMEDIA INFORMATION MATERIALS

RELATED APPLICATION

The present application is a continuation of U.S. patent application Ser. No. 09/994,985, which was filed on Nov. 26, 2001, is assigned to the assignee of present invention and is incorporated by reference herein.

BACKGROUND OF THE INVENTION

The invention relates generally to the field of television, video and multimedia presentations. More specifically, the invention relates to personalized sequencing of multimedia (visual, audio and/or text) information segments, e.g., video clips, to create a custom presentation of the clips.

A newscast presented by a local television station or a national television network may include news, weather, traffic, sports, and feature programs. Such newscasts may present the news in an order such as news headlines, several news stories, weather, sports, and a feature segment. This order is usually presented to viewers based on perceived importance by a news director or producer.

With the advent of the World Wide Web (WWW or "the Web"), many television stations and national networks have websites that describe the programs broadcast on those stations. A user accessing one of these websites may be able to read the weather report presented in a newscast earlier that day, or review the news or sports stories delivered during the newscasts broadcast that day or in the recent past. In some instances, if the user's computer has audio and video capabilities, the user may be able to play back the whole newscast or a selected news or sports story. The content may be downloaded to the user's computer and played back using a media player, or the content may consist of streaming video over which playback the user exercises little or no control.

A local news station in New York City, "NY1," takes this playback capability one step further. That station's website (www.ny1.com) includes a "Build-A-Newscast" section where users may create their own newscast simply by selecting from a menu of about fourteen topic areas up to three currently-airing video clips in the order the users desire.

SUMMARY OF THE INVENTION

Although useful for somewhat customizing the presentation of news stories being aired currently, NY1's program has several drawbacks. This program only allows users to select news categories, not individual news clips (the content of which is chosen by the website operator), does not include news clips older than one or two days, does not allow the user to search a database from which to choose news clips, and only includes a presentation of three news clips at the most. What is needed is a way to personalize newscasts and video broadcasts, in which the user has full control over the content of the broadcast.

The present invention provides a system and method for presenting multimedia information materials from a database, for example, as a video broadcast. The method includes storing a plurality of information segments in the database, providing an option to review the content of at least part of an information segment, selecting information segments from the database, and allowing a user to organize a subset of the selected information segments to affect a presentation of those information segments. In one embodiment, the subset of selected information segments is loaded into a memory, such as that associated with a personal computer, a set-top box, or a personal video recorder.

Another embodiment of the present invention includes indicators representing the selected information segments, in which the organization of the subset of the selected information segments can be manipulated by arranging in a selected order the indicators corresponding to the subset of the selected information segments. The subset of selected information segments may be presented in the same order as the corresponding indicators. The indicators may be stored in a buffer, and the buffer can be a virtual "shopping cart." The presentation may include playing, pausing, rewinding, and fast forwarding the corresponding information segments. These corresponding information segments can include video clips, in which case the presentation may include skipping forward or backward at least one video clip. The information segments in the database can include video clips or other visual, audio, or text information. In one embodiment, the presentation may be realized using a computer, a media player, or a television, the latter of which preferably interfaces with a set-top box and/or a personal video recorder.

Another method of the present invention includes providing a buffer, which, for example, can include a virtual cart, receiving selections of information segments in the database, where the selected information segments are represented by respective indicators in the buffer, arranging a subset of the indicators in a selected order, and presenting particular information segments represented by the subset of the indicators corresponding to those segments. The particular information segments are presented in the same order as the corresponding indicators arranged in the subset. In one embodiment, the particular information segments are loaded into a memory, such as that associated with a personal computer, a set-top box, or a personal video recorder. In another embodiment, the subset of the indicators can be selected, and the subset can be arranged in response to input commands.

Another method of the present invention includes receiving a request including one or more preferences concerning desired information segments, searching the database in response to the request, providing an indicator representative of at least one information segment selected from the database which satisfies the preferences, placing the indicator in a buffer, arranging the indicator with at least a second indicator in the buffer in a selected order, where the second indicator is representative of a second information segment, and presenting the selected information segment and the second information segment in the selected order. In one embodiment, the request is formulated in accordance with a predetermined search template. In another embodiment, the preferences are derived from a user preference file. In a further embodiment, the request is received through a network, which may be part of the Internet. Again, the buffer may include a virtual cart, and the information segments in the database can include video clips, and can contain visual, audio, and/or text information.

Another method of the present invention includes generating preferences for selecting information segments from the database, providing a buffer for retaining indicators of information segments selected according to the preferences, arranging a subset of the indicators in a selected order, and presenting particular information segments represented by the subset of the indicators corresponding to the segments. The particular information segments are then presented in the same order as the corresponding indicators arranged in the subset. The preferences may be generated by receiving information regarding a user's identity, using the information to verify the user's identity, and retrieving a user preference file based on the verified identity. This user preference file may include the preferences for selecting information segments from the database. In another embodiment, a customized interface may be generated based on the preferences in the user preference file.

The system of the present invention includes a database containing a plurality of information segments, a processing unit for providing an option to review the content of at least part of an information segment, an interface for selecting information segments from the database, and a controller for allowing a user to manipulate an organization of a subset of the selected information segments to affect a presentation of those information segments. The system may further include a memory into which the subset of selected information segments may be loaded. This memory may be associated with a personal computer, a set-top box, or a personal video recorder. In one embodiment, indicators representing the selected information segments may be provided, and the organization of the subset of the selected information segments may be manipulated by arranging in a selected order the indicators corresponding to the subset of the selected information segments. In another embodiment, at least one of the information segments in the database includes a video clip, and the information segments can include visual, audio, and/or text information. The presentation may be realized using a computer, a media player, or a television, the latter of which preferably interfaces with a set-top box and/or a personal video recorder.

The present invention presents specific information segments, such as video clips, where each segment is specifically chosen by a user, not by a segment provider. The term "information segment" broadly encompasses any multimedia information segment containing visual, audio and/or text information which can be perceived using appropriate equipment, e.g., a personal computer, television set, personal video recorder, personal digital assistant (PDA), telephonic equipment, media player, etc. These information segments may relate to nearly any topic of a user's interest. Information segments are selected, and indicators of those segments may be organized so that a subset of the selected information segments may be presented. A subset can be any number of the information segments less than or equal to all of the information segments selected. Information segments may be chosen by searching a database or by having the segments saved according to a user's interests.

Additional advantages of the invention will be set forth in the description which follows, and in part will be obvious from the description, or may be learned by practice of the invention. The advantages of the invention may be realized and obtained by means of the instrumentalities and combinations particularly pointed out in the appended claims.

BRIEF DESCRIPTION OF THE DRAWINGS

The accompanying drawings, in which like reference numerals represent like parts, are incorporated in and constitute a part of the specification. The drawings illustrate presently preferred embodiments of the invention and, together with the general description given above and the detailed description given below, serve to explain the principles of the invention.

DETAILED DESCRIPTION

The invention allows a user to create a presentation of video clips that (1) the user selects while browsing a video clip database or (2) are selected for the user based on the user's interests or preferences. It should be noted that the term "video clip" used here is for convenience only, which broadly encompasses any multimedia information segment containing visual, audio and/or text information which can be perceived using appropriate equipment, e.g., a personal computer, television set, personal video recorder, personal digital assistant (PDA), telephonic equipment, media player, etc. Further, the term "video" is conveniently used here to mean "visual, audio and/or text" as understood by a person skilled in the art under appropriate circumstances. The user arranges the selected video clips and is then able to play and/or save the video presentation. In an exemplary application of the present invention, the user creates a newscast made up of video clips chosen from a video clip database belonging to a news organization's website. Preferably, the user browses the database using a browser capable of accessing the Internet and the Web. The user chooses individual clips one at a time using any of a number of ways of accessing the database. Then, the user arranges some or all of the video clips to complete the presentation, and may view the presentation or save it for later viewing.

The instant description uses a website of a news organization to illustrate the invention. However, the invention is not limited to news stories or building a customized newscast. Rather, the invention may be used to arrange selected video clips of non-news events such as materials from variety television shows and comedy television shows. Other applications are discussed later.

Figure 1:
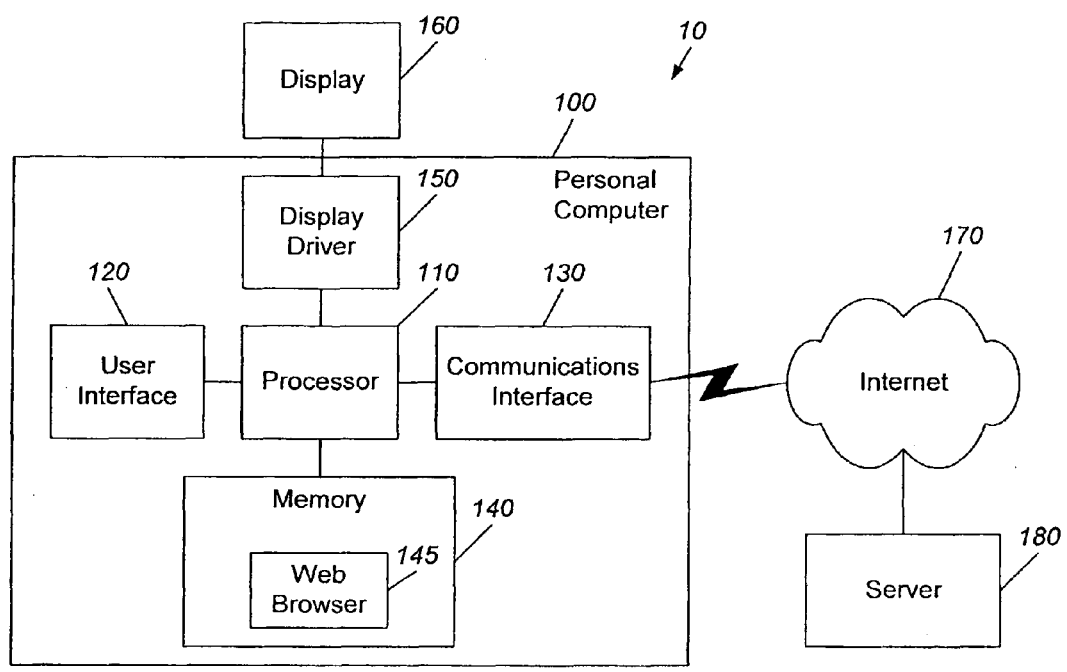
FIG. 1 illustrates an arrangement for accessing a server providing video clips for user presentation in accordance with the invention.

FIG. 1 illustrates an arrangement 10 in which a user at a computer (e.g., personal computer (PC) 100) accesses server 180 providing video clips and other program materials which may be customized for viewing in accordance with the invention. Server 180 is connected to the Internet 170 at a predetermined uniform resource locator (URL). PC 100 includes, among others, a processor 110, a user interface 120, a communications interface 130, a memory 140, including a web browser 145, and a display driver 150, which is connected to display 160. Processor 110 is preferably the central processing unit (CPU) of PC 100, and may include a microprocessor or other type of processor. User interface 120 serves as an interface for exchanging information between PC 100 and the user, which includes, for example, a mouse, keyboard, microphone, audio circuitry, speakers, etc. Communications interface 130 may include modem and broadband (high-speed)

facilities and allows the user to communicate with servers, such as server 180, through an external network, such as Internet 170. Memory 140 may include non-volatile memory (e.g., ROM), volatile memory (e.g., RAM), and hard and floppy disk memory, and in this instance stores, among others, web browser 145, examples of which are Microsoft® Internet Explorer and Netscape® Navigator or Communicator. PC 100 outputs video content to display driver 150 which formats the video content for display on display 160, which may be a CRT monitor or LCD screen, etc.

Server 180 has access to a database of video clips and other information materials. Server 180 also includes or can access a processor that allows a user to review the content of the video clips. In addition, server 180 includes an interface for indicating to a user which video clips are selected from the database. Server 180 also includes a controller that lets a user organize a subset of the video clips (or, more accurately, screen representations of those clips), so that the server may present the video clips in the indicated order. The subset may include any number of video clips up to and including all of the selected video clips.

Figure 2:
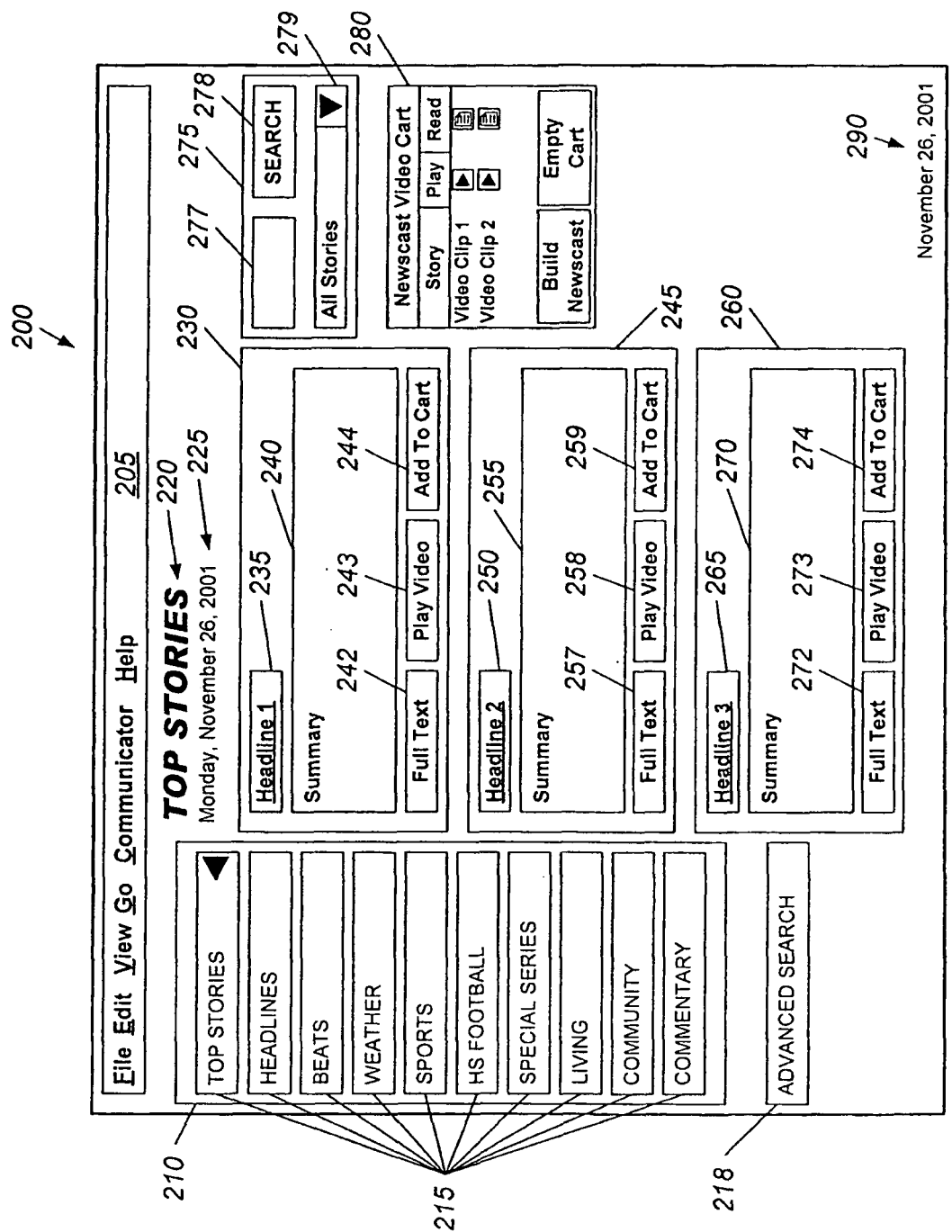
FIG. 2 illustrates a web page furnished by the server which shows headlines and summaries of news stories and viewing options.

After the user at PC 100 causes communications interface 130 to establish an Internet connection through Internet 170 to server 180 at the predetermined URL, server 180 transmits a first web page to PC 100 via the established connection. FIG. 2 illustrates the first web page (denoted 200) opened by web browser 145. As shown in FIG. 2, web page 200 includes headlines and summaries of news stories and viewing options. Web page 200 also includes general items such as a menu block 205, a news category block 210, individual news categories 215, a web page title 220, and the date 225 (which may also be shown in other places on the web page, such as in position 290). For the specific category shown in FIG. 2, "Top Stories," three news story blocks 230, 245, and 260 are shown, each of which includes a headline 235, 250, 265, a news story summary 240, 255, 270, and three news story options 242-244, 257-259, and 272-274. These options include viewing the full text of the news story, viewing the news story video clip, and adding the news story video clip to the user's "shopping cart" or "video cart" which contains selected video clips. Block 280 illustrates a video cart for collecting video clips in accordance with the invention. By way of example, video cart 280 includes a listing of video clips selected for the video cart (selected by choosing with user interface 120 the "Add to Cart" option), icons to play the individual video clip or to read the full text thereof which includes a transcription of the audio portion of the video clip, and web buttons to build a customized video presentation ("Build Newscast" button) and to empty (e.g., "clear") the user's video cart. Building a customized video presentation using the video clips in the video cart is fully described below. FIG. 2 also illustrates search block 275, which includes keyword area 277, search button 278, and category drop-down list 279, which is fully described below as well.

Web page 200 shows the results of choosing the "Top Stories" news category 215, which category is reflected in web page title 220. A news category may be chosen using user interface 120, for example by directing a mouse to the news category block and clicking or by moving a cursor using keyboard navigation keys (e.g., arrows and "tab" key) and typing "Enter." Choosing "Top Stories" causes a number (three in FIG. 2, although more or fewer may easily appear) of news stories to appear, each having a headline and a news summary. To view the full text of the news story, a user may choose, using the mouse or keyboard, either a headline, a news story summary, or the "full text" button below the summary, the result of which is shown in FIG. 3.

Figure 3:
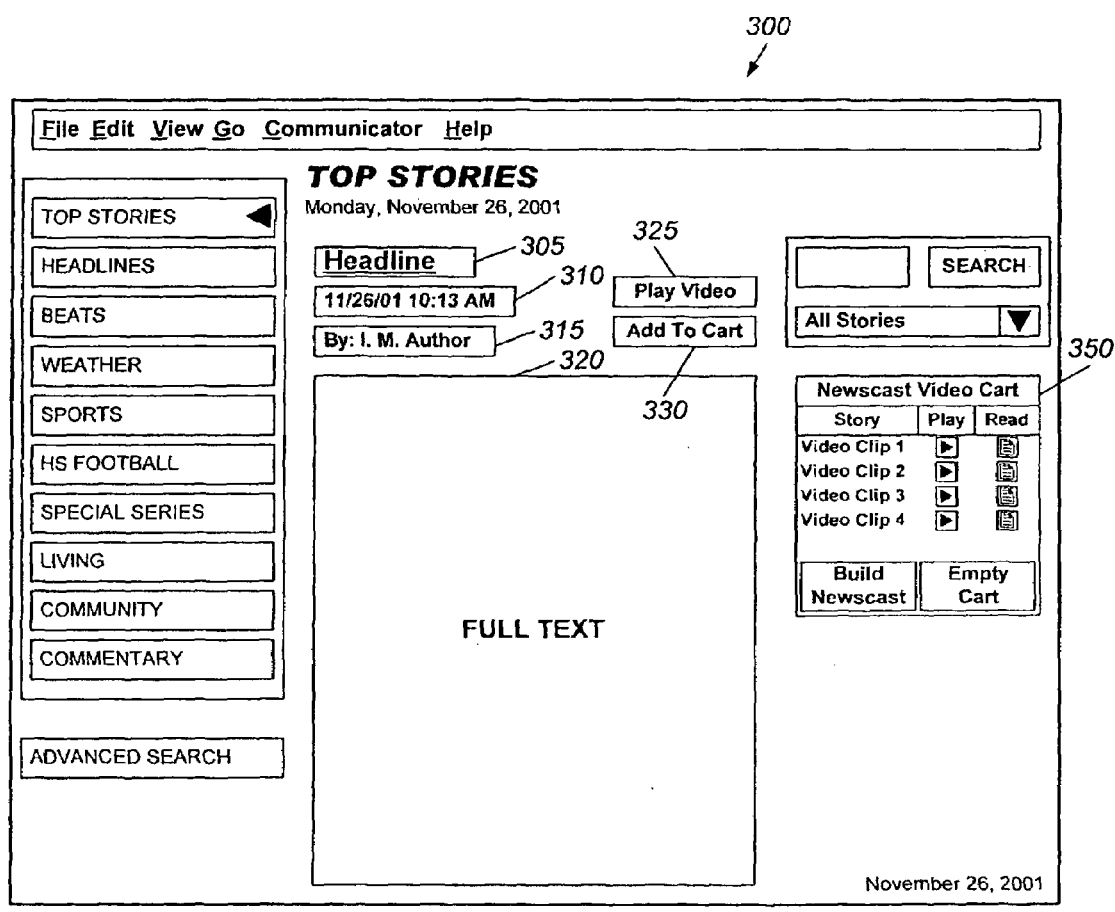
FIG. 3 illustrates a second web page furnished by the server which shows the full text of a news story and additional options.

FIG. 3 illustrates a second web page 300, which includes the full text of an individual news story and additional options. Web page 300 includes headline 305, date/time 310 showing the date and time the news story was first written, posted to the website, or broadcast in some other medium (such as TV), block 315 showing the author of the news story, and block 320 indicating the full text of the news story that a user may read. When viewing an individual news story as in FIG. 3, a user may choose a "play video" button 325 or an "add to cart" button 330, which buttons perform the same functions as buttons 243-244, 258-259, or 273-274 in FIG. 2. Block 350 shows video cart 280 which has been updated to show two more video clips added by the user in the course of viewing the corresponding news material.

Figures 4A, 4B:
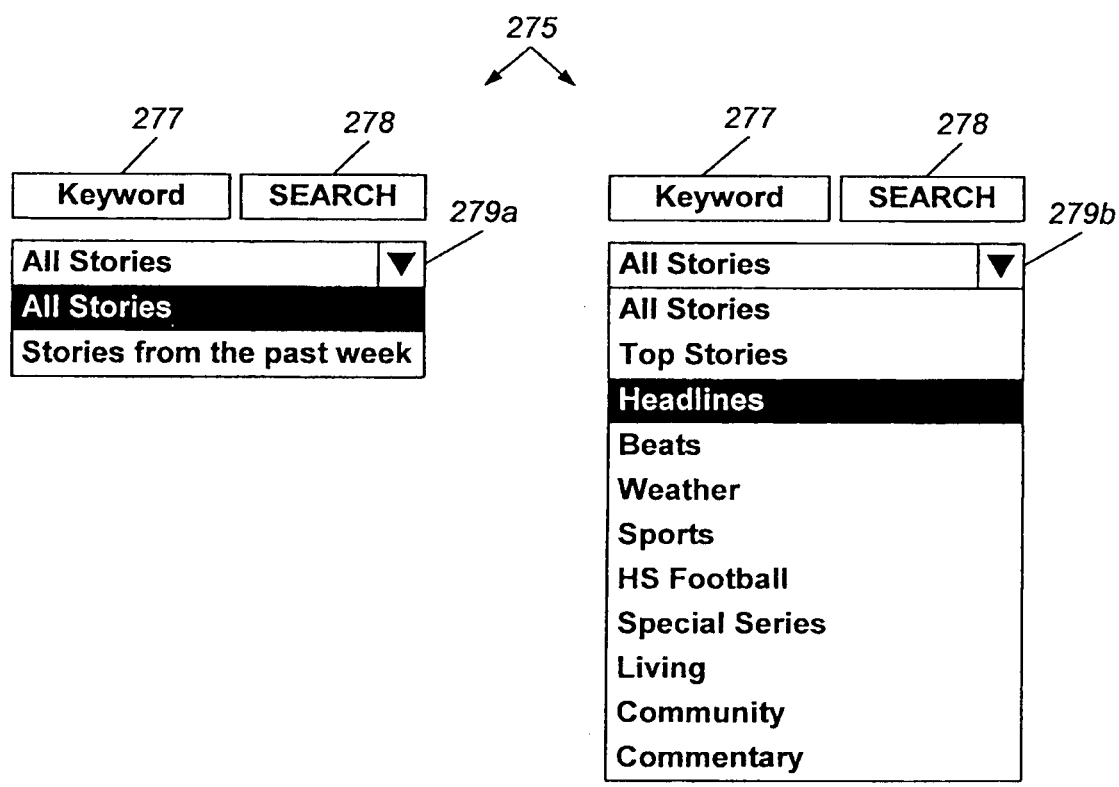
FIGS. 4A and 4B jointly illustrate keyword search functions in accordance with an aspect of the invention.

FIGS. 4A and 4B illustrate two examples of simple keyword search functions in search block 275 in FIG. 2. In each example, in keyword area 277 a user may type one or more keywords that the user wants searched in the news story database, and to start the search the user chooses search button 278. The user in category drop-down lists 279a, 279b may also indicate the scope of search: in FIG. 4A, the user may choose between "All Stories" in the database or only stories from the past week; in FIG. 4B, the user may choose between "All Stories" in the database, or may narrow the search by choosing a specific category (the category "Headlines" is shown highlighted). The results of a search are further described below.

Figure 5:
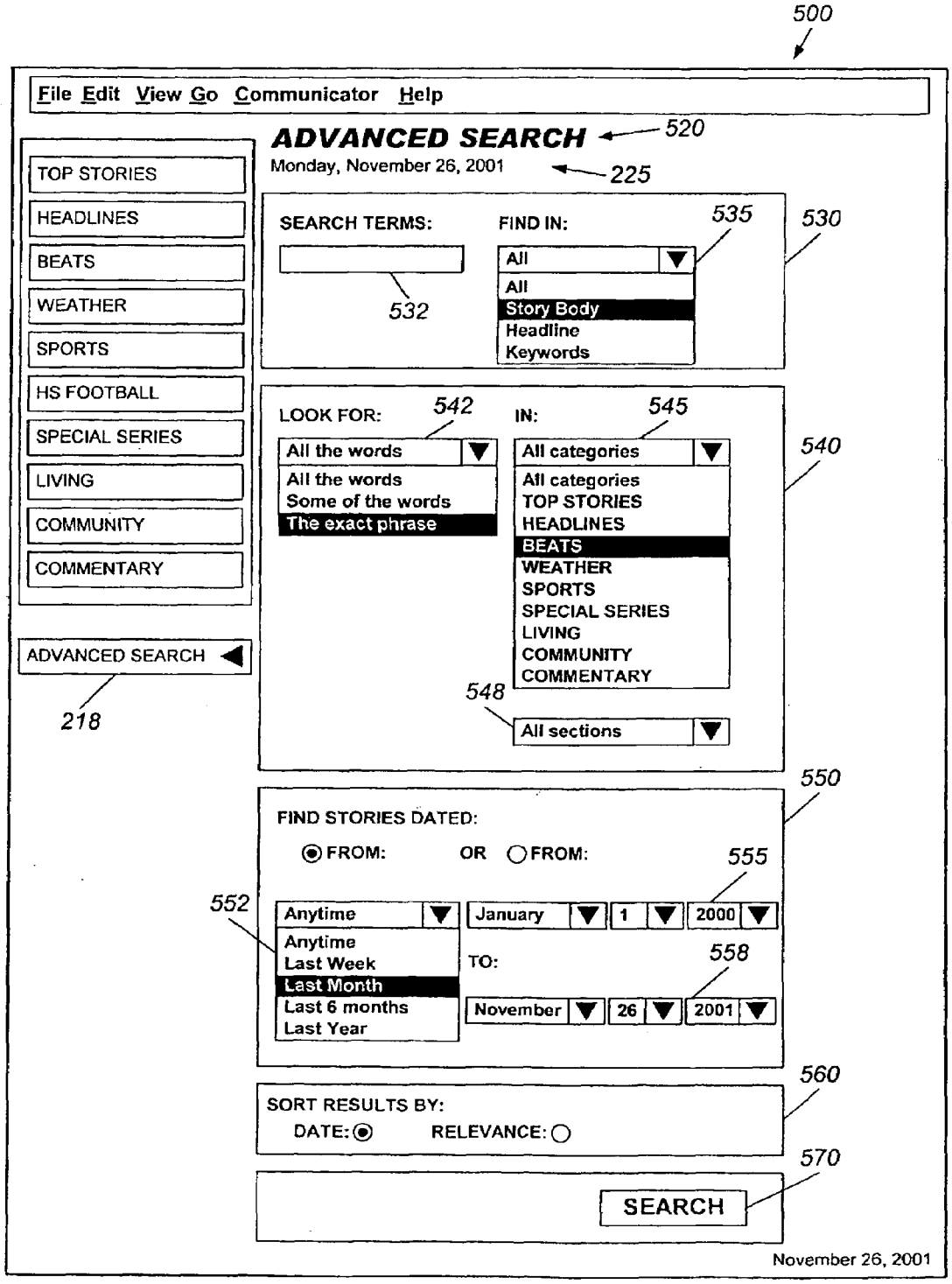
FIG. 5 illustrates a third web page furnished by the server which shows advanced search functions.

In addition to choosing a news story category 215 in FIG. 2, a user may choose to make an advanced search by choosing advanced search button 218. FIG. 5 illustrates an Advanced Search web page 500 that may appear once an advanced search is chosen. This page includes web page title 520 ("Advanced Search"), search-term block 530, search-scope block 540, date block 550, sort block 560, and search button 570.

Search-term block 530 may, for instance, include keyword area 532, which may operate the same as keyword block 277 or may allow a more varied assortment of search terms, and news story area 535, which includes a drop-down list of parts of the news stories in which to search for the search terms. News story area 535 allows a user to search whole news stories ("All"), or just within the story body, the headline, or a "keywords" field which may be associated with a news story.

Search-scope block 540 may include, for instance, search-type drop-down list 542, category drop-down list 545, and section drop-down list 548. Search-type drop-down list 542 may include the way in which the user wants the search to be limited: choose stories including all of the search terms, some or any of the search terms, or the exact search phrase. Category drop-down list 545 operates like category drop-down list 279 described in FIGS. 2 and 4A and 4B. Section drop-down list 548 includes only "all sections" in FIG. 5, but could be used to narrow the search to return results from specific sections of a news story (as distinct from the choices in category drop-down list 545).

Date block 550 allows the user to search news stories within a specific time back from the present or between any two dates of stories available in the database. Fixed timeframe drop-down box 552 allows the user to search news stories within a specific time in relation to the current date: "last week," "last month," "last six months," or "last year." Specific-date blocks 555, 558 allow the user to search news stories between any two dates.

Sort block 560 includes two choices, "date" and "relevance," and indicates the user's preference for the order of the search results: by date, preferably most recent first, or by relevance, based on how close the search result is to the exact search phrase used.

Figure 6:
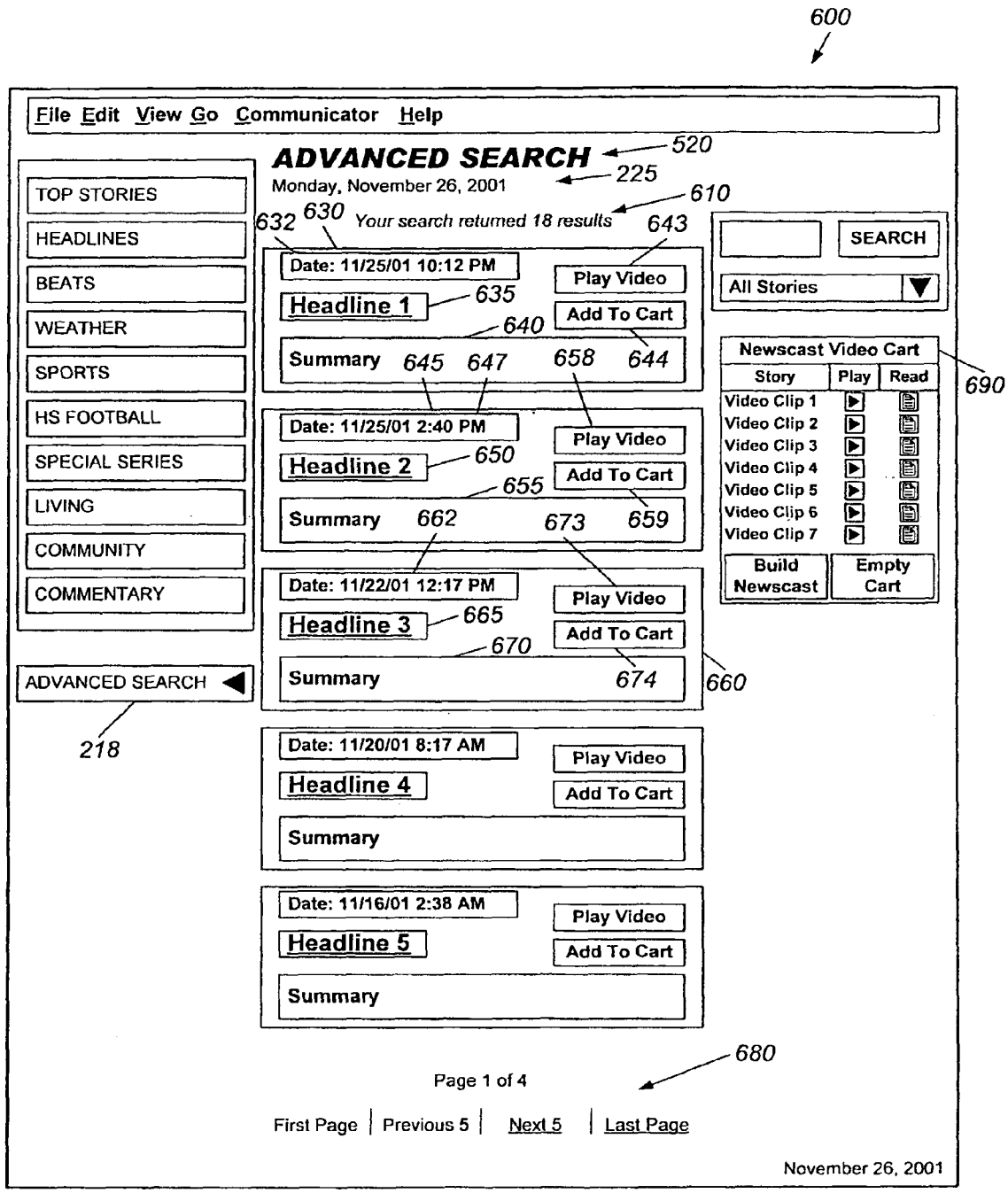
FIG. 6 illustrates a fourth web page furnished by the server which shows search results by headline and summary.

Once all the advanced search choices are entered, the user chooses search button 570 to start the search. The search results from a simple or advanced search are shown on web page 600 in FIG. 6, which includes web page title 520, search summary 610, and five news stories for the first of four pages of search results. Page 600 includes news story blocks 630, 645, 660, page navigator 680, and video cart 690. Similar to news story blocks 230, 245, 260, each news story block 630, 645, 660 includes a headline 635, 650, 665, a news story summary 640, 655, 670, and news story options 643-644, 658-659, and 673-674. In addition, news story blocks 630, 645, 660 include date/time block 632, 647, 662. Page navigator 680 includes information as to how many search result pages there are, which result page the user is viewing, and shortcut links to the first page, last page, next page ("next 5"), and previous page ("previous 5"). Video cart 690 is shown as an update of video cart 350, with three more video clips added by the user in the course of viewing corresponding news material.

Figure 7:
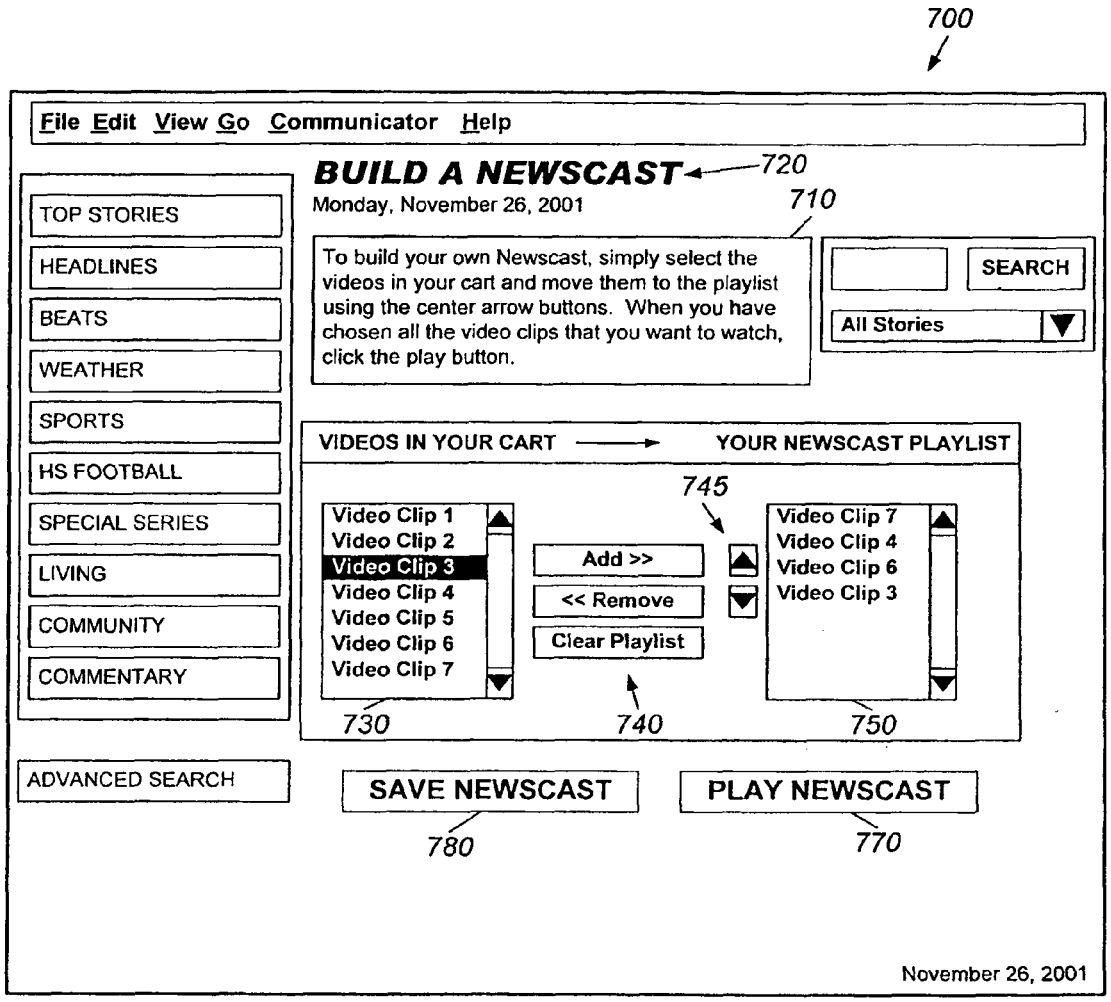
FIG. 7 illustrates a fifth web page furnished by the server which shows a cart containing indicators representative of selected video clips.

As mentioned earlier with respect to the video cart, a user may choose the "Build Newscast" button to begin customizing a newscast in accordance with the invention. FIG. 7 illustrates Build-A-Newscast web page 700 showing the video cart and video clips selected for the custom video presentation. Included on web page 700 are directions 710, web page title 720, video cart 730, option buttons 740, option button arrows 745, playlist 750, play newscast button 770, and save newscast button 780.

Directions 710 let the user know how to select the video clips from the video cart to make the custom video presentation. Video cart 730 includes the clips previously included in video carts 280, 350, and 690, but without the Play or Read options found in those video carts (although such options could be added to video cart 730 to enable the user to quickly identify the clips).

Option buttons 740 preferably include "Add," "Remove," and "Clear Playlist." As the button names indicate, highlighting a video clip in video cart 730 (e.g., video clip 3) and choosing "Add" will copy the name of the selected video clip to playlist 750 (video clip 3 is shown at the end of playlist 750), highlighting a video clip in playlist 750 and choosing "Remove" will delete the selected video clip from playlist 750, and "Clear Playlist" will remove all selected video clips from playlist 750. The order of the video clips in the playlist is the order in which the video clips are added to the playlist. There are alternate ways of arranging the video clips in the playlist. One way is use option button arrows 745 to move up or down the position of a video clip already in the playlist. Another way is to "drag and drop" video clips within the playlist and between the video cart and the playlist. In this way, the user uses a mouse to click on a clip in video cart 730, "drags" the clip to the playlist, and "drops" the clip in the playlist in the desired play position. A third way obviates the use of a separate playlist by assigning to the video clips in the video cart numbers indicating in which position the clip should be played.

Once the playlist is finalized, the user may play the newscast or save it (e.g., by downloading it from server 180) in memory 140 or other storage device within PC 100, or, in another embodiment, in a memory associated with a set-top box or a personal video recorder. The user saves the newscast by choosing save newscast button 780 and choosing a video format, such as MPEG, AVI, Quicktime®, RealPlayer®, Windows® Media Player, Vivo®, and others, in which the broadcast should be saved. To play the newscast, the user chooses play newscast button 770 to start the video presentation. This preferably opens up another window which includes a video player such as RealPlayer® or Windows® Media Player. Alternatively, such a player could open up within the Build-A-Newscast or video cart window itself. Preferably, the command to play the newscast is sent to server 180, which prepares a presentation including the selected video clips in the chosen order. Server 180 sends (e.g., downloads) the broadcast to the video player which plays the customized video. Alternatively, server 180 could stream the video clips to the video player in the order selected. Preferably, the user has the ability to control the playback of the newscast in ways reminiscent of video on demand (VOD). For example, there may be play, pause, fast forward, and rewind buttons on the video player to control the viewing within a video clip. There may also be controls to skip to the next clip or back to the previous clip or to dynamically choose any of the clips within the newscast.

In an advantageous embodiment of the present invention, a user can personalize or customize the newscast website itself so that the categories and options presented are directed to the user's preferences. Thus, instead of the generic website home page as shown in FIG. 2, a personalized home page may include only the news categories of interest to the user, such as "Headlines," "Weather," and "Sports." All the other options to select specific video clips for customizing a broadcast remain active, but, for instance, a simple search using search block 275 would search only the user's preferred categories rather than the whole website. (If the user wanted to expand the categories searched, the user could use the Advanced Search template as shown in FIG. 5.)

Figure 8A:
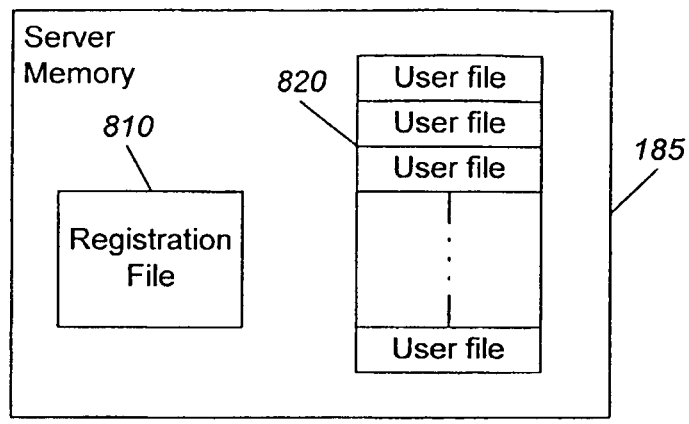
FIGS. 8A and 8B illustrate how a user's preferences may be implemented.
Figure 8B:
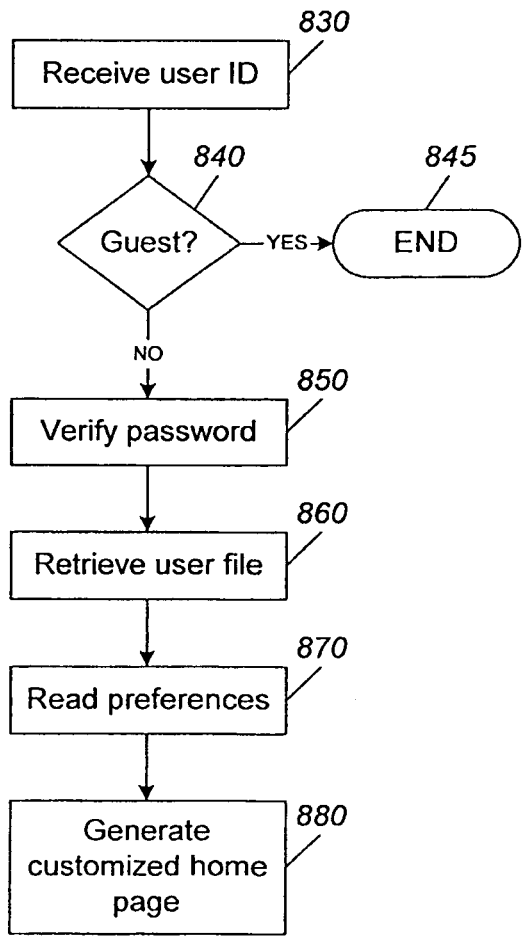

One way such a preference scheme can be implemented is shown in FIGS. 8A and 8B. FIG. 8A shows server memory 185, which is part of server 180. Within server memory 185 are registration file 810 and user files 820. Registration file 810 keeps track of users' IDs and passwords; each user file 820 is associated with a user ID and contains the specific user's website preferences. As described above, these preferences may include which news categories should be displayed on a user's customized home page. A user file can also include other preferences, including other content preferences (such as preferences regarding the dates of the news stories of interest), website viewing preferences (for instance, where the categories' toolbar is displayed), news story display preferences (such as how many summary lines to display), etc.

FIG. 8B is a flowchart showing how the user files are accessed. In step 830, server 180 receives a user ID and password from a user who logs on to the newscast website. This may be accomplished by use of "cookies" (user ID and/or password information stored on the hard drive of the user's PC 100) or the user may input the user ID and password to the browser. If, in step 840, the user ID is not found within registration file 810 because, for example, the user is a guest, a customized website is not available for the user and the process ends in step 845. In that case, the website can prompt the user to establish a user ID (i.e., register for the website) and thereby create a user file 820 for that user. If, in step 840, the user ID is found within registration file 810, the process in step 850 verifies the password associated with that user ID. Then, in step 860, the process retrieves user file 820 associated with the user ID and, in step 870, reads the user's preferences from user file 820, and, in step 880, generates a customized home page for that specific user.

Because local and national newscasts are generally made up of discrete video clips, it is easy to apply the present invention to use the video clips making up those newscasts to create custom newscasts. Other applications also take advantage of the present invention. For example, in a second embodiment of the invention, a viewer creates a broadcast of football (or other sports) highlights, and these highlights could be searched based on attributes such as which players appear in the clips, which teams are playing, which leagues are involved, or which cities are represented. In this way, a viewer browsing a highlights database could search for a player named Joe Smith and/or for a team from Pittsburgh, for example, and all the video clips showing Joe Smith and/or Pittsburgh could be returned, allowing the user to save selected clips in the video cart and then arrange the clips to create a custom presentation.

In a third embodiment of the invention, server 180 provides video feeds from traffic cameras around a city. A user chooses clips from the cameras located between the user's home and workplace, arranges those camera clips in the order the cameras are encountered during a commute, and creates a custom presentation forecasting the user's commute. As described with reference to FIGS. 8A and 8B, the customized website may include the news category "traffic" as well as remember the user's favorite commuter cameras.

The types of video clips that may be used with the present invention are practically limitless. Sketches from variety shows, highlights from situation comedy shows, amateur video footage, weather satellite or radar clips, political speeches, and videotaped class lectures are just a few. The video clip database may be set up to code (i.e., assign attributes to) the video clips based on type of video, people or places appearing in the video clip, origin of the video clip, or length of video clip, to name just a few of the many attributes of the video clips.

In addition, the present invention is not limited to browsing video clips via the Internet. For example, a viewer uses a set-top box, which is connected to the television set and is normally associated with cable or satellite programming, and a remote control to search a video clip database, select video clips and put them in a video cart, and arrange the selected clips into a custom broadcast in a manner similar to that described above in relation to the custom newscast. A viewer may also use a personal video recorder (also called a "digital video recorder"), such as those made to be used with TiVo® and ReplayTV® services, to access video clips and store them for custom playback later. A viewer may also program such a personal video recorder to download video clips based on the viewer's interests, such as actors in a TV show or movie, type of TV shows, etc. These clips may be downloaded on a regular basis with the viewer arranging the order in which the clips are to be viewed, in accordance with the invention. Both the set-top box and the personal video recorder can be used to set up a customized interface with the video clip server, as described above with respect to the customized website. The server can identify the set-top box or personal video recorder using cookie-like information and thereby retrieve the user file which contains the user's preferences.

As discussed above, additional advantages and modifications will readily occur to those skilled in the art. Therefore, the present invention in its broader aspects is not limited to the specific embodiments, details, and representative devices shown and described herein. Accordingly, various changes, substitutions, and alterations may be made to such embodiments without departing from the spirit or scope of the general inventive concept as defined by the appended claims.

We claim:

1. A method for presenting multimedia information segments to a user via a display device, the display device displaying first, second, and third, different regions, the method comprising:
   displaying in the first region a plurality of first indicators, each first indicator corresponding to a respective multimedia information segment, wherein the multimedia information segments comprise content;
   receiving at least two first selections of displayed first indicators, from the user, in an order of selection;
   simultaneously displaying in the second region a first list of second indicators representing the at least two of the selected first indicators, in a first sequence;
   receiving from the user second selections from the first list of second indicators in the second region, in a second sequence;
   simultaneously displaying in the third region a second list of third indicators representing the selected second indicators in the second sequence; and
   playing the content of the multimedia information segments represented by the third indicators in an order of the second list of third indicators.

2. The method of claim 1, comprising:
   allowing the user to rearrange the second sequence of third indicators in the third region; and
   playing the multimedia information segments in the third region in the rearranged order of the third indicators.

3. The method of claim 1, further comprising:
   storing a first plurality of multimedia information segments in a database; and
   searching the stored multimedia information segments in the database based on at least one parameter;
   wherein displaying in the first region the plurality of first indicators comprises displaying first indicators representative of multimedia information segments responsive to the search.

4. The method of claim 1, further comprising loading the multimedia information segments corresponding to the third indicators into a memory.

5. The method of claim 4, further comprising loading the multimedia information segments corresponding to the third indicators into a memory associated with a personal computer, a set-top box, or a personal video recorder.

6. The method of claim 1, further comprising controlling the playing of multimedia information segments, by the user.

7. The method claim 1, wherein at least some of the plurality of multimedia information segments comprise video clips.

8. The method of claim 1, comprising playing the user selected multimedia information segments on a computer display or on a television.

9. The method of claim 1, comprising:
   displaying in the second region the first list of selected information segments in the first sequence, in the order the information segments are selected.

10. The method of claim 1, further comprising:
    displaying the first and second regions on a first page;
    displaying the third region on a second page different from the first page;
    after receiving the selections of the at least two second indicators, displaying the selected second indicators in the second sequence in a fourth region different from the third region, on the second page;
    receiving the selections of the at least two second indicators for presentation in the second sequence, from the user, from the fourth region on the second page; and displaying in the third region on the second page the selected third indicators, in the second sequence.

11. The method of claim 1, further comprising:
displaying in a fourth region of the display device different from the first, second, and third regions, one or more graphical markers representing respective topics of multimedia information segments;
receiving from a user a selection of a graphical marker corresponding to a respective topic; and
displaying in the first region first indicators corresponding to respective stored multimedia information segments associated with the selected graphical marker, for selection by the user.

12. The method of claim 11, comprising displaying in the fourth region one or more graphical markers representing respective topics, based, at least in part, on predefined user preferences.

13. A method for presenting multimedia information segments to a user via a display device, the display device displaying first and second different regions on a first page, third and fourth different regions on a second page different from the first page, and fourth and fifth regions on a third page different from the first, second, and third pages, the method comprising:
searching a database for multimedia information segments stored in the database, in response to a request from a user, wherein multimedia information segments comprise content;
displaying in the first region of the first page a first list comprising a plurality of first indicators, each first indicator corresponding to a respective multimedia information segment found in response to the request;
simultaneously displaying in the second region of the first page, in a second list different from the first list, at least two second indicators representative of respective multimedia information segments selected by the user from the first list in the first region, in a first sequence;
displaying in the third region on a second page of the display device different from the first page a third list of third indicators representative of respective second indicators, in the first sequence;
displaying in the fourth region on the second page, a fourth list comprising one or more additional first indicators representative of additional respective multimedia information segments found in response to the request, at least some of the one or more additional first indicators not being displayed on the first page;
adding to the third list in the third region at least one additional first indicator selected by the user from the one or more additional first indicators, to form a second sequence;
displaying on the third page, in a fifth region, a fourth list of fourth indicators representative of the third indicators in the third list in the third region, in the second sequence;
displaying on the third page, in a sixth region different from the fifth region, a sixth list of fifth indicators representative of respective fourth indicators, in a third sequence selected by the user, the third sequence of fifth indicators being different from the second sequence; and
playing the content of the multimedia information segments corresponding to the fifth indicators in the third sequence, in the order of the third sequence in the fifth list.

14. The method of claim 13, wherein the request comprises one or more search terms received from the user.

15. The method of claim 14, comprising:
receiving the request via a network.

16. The method of claim 13, wherein the multimedia information segments in the database comprise video clips.

17. A system for presenting multimedia information segments to a user, the system comprising:
a database containing a plurality of multimedia information segments comprising content; and
at least one processing unit associated with the database and coupled to a network, the at least one processing unit being configured to:
generate a graphical user interface on a display device, via the network, the graphical user interface comprising a first page defining first and second, different regions;
the graphical user interface being configured to:
display first indicators corresponding to at least certain of the plurality of multimedia information segments in the first region;
allow a user to select first indicators from the first region; and
simultaneously display second indicators in a first list in the second region representative of the selected first indicators, in a first sequence;
the graphical user interface comprising a second page different from the first page, the second page defining a third region;
the graphical user interface being further configured to:
display third indicators representing respective second indicators, in a second list in the third region, in the first sequence;
define a fourth region on the second page different from the third region;
display fourth indicators representing respective third indicators selected by the user from the second list, in the fourth region in a third list in a third sequence of fourth indicators different from the second sequence; and
cause playback of the content of the multimedia information segments represented by the fourth indicators in an order of the third sequence in the third list, on the display device.

18. The system of claim 17, wherein the at least one processing unit is configured to load the multimedia information segments corresponding to the third indicators in memory associated with the display device.

19. The system of claim 18, wherein the memory and the display are associated with a personal computer, a set-top box, or a personal video recorder.

20. The system of claim 17, wherein at least some of the multimedia information segments comprise video clips.

21. A system for presenting multimedia information segments to a user, the system comprising:
a database containing a plurality of multimedia information segments containing content; and
at least one processing unit associated with the database and coupled to a network, the at least one processing unit being configured to:
generate a graphical user interface on a display device, via the network, the graphical user interface comprising a first page defining first and second, different regions;
conduct a search of the database in response to a user request;
the graphical user interface being configured to:
display first indicators corresponding to at least certain of the respective information segments found in the search, in a first list in the first region;
allow a user to select first indicators from the first region;
display second indicators in the second region representative of the first indicators, respectively, in a second list in a first sequence;

define a second page different than the first page, the second page comprising third and fourth regions;

display in a third list in the third region additional first indicators representative of respective multimedia information segments found in the search and where at least some of the additional first indicators are not displayed in the first region;

display in a fourth list in the fourth region the third indicators representative of respective second indicators in the second region, in the first sequence, and fourth indicators representative of respective additional first indicators selected by the user from the third region, the third and fourth indicators being in a second sequence;

the graphical user interface further comprising fifth and sixth regions;

the graphical user interface being further configured to:

display in a fifth list fifth indicators representing respective third and fourth indicators, in the third region, in a third sequence;

display in a sixth list in the sixth region sixth indicators representing respective fifth indicators selected by the user from the fifth list in a fourth sequence of sixth indicators different from the third sequence; and the graphical user interface being further configured to cause playback of the content of the information segments represented by the sixth indicators in the sixth list in the fourth sequence.

22. The system of claim 21, wherein the at least one processing unit is configured to load the multimedia information segments corresponding to the third indicators in memory associated with the display device.

23. The system of claim 22, wherein the memory and the display are associated with a personal computer, a set-top box, or a personal video recorder.

24. The system of claim 21, wherein at least some of the multimedia information segments comprise video clips.

25. The system of claim 21, wherein the graphical user interface is configured to allow the user to rearrange the third sequence of fifth indicators to form the fourth sequence of fifth indicators.

26. The method of claim 10, wherein the first page and the second page comprise respective web pages.

27. The method of claim 1, further comprising:
receiving the multimedia information segments corresponding to the third indicators in the second list, from a source separate from the display device, via a network.

28. The method of claim 1, further comprising:
storing the indicators in memory, prior to playing the content.

29. The method of claim 1, wherein at least one of the steps is performed by a processing device coupled to the display device via a network.

* * * * *